United States Patent
Chung et al.

(10) Patent No.: US 10,514,702 B2
(45) Date of Patent: Dec. 24, 2019

(54) METHOD FOR DETECTING FLOOR OBSTACLE USING LASER RANGE FINDER

(71) Applicant: Korea University Research and Business Foundation, Seoul (KR)

(72) Inventors: Woojin Chung, Seoul (KR); Hyunsuk Lee, Seoul (KR)

(73) Assignee: Korea University Research and Business Foundation, Seoul (KR)

( * ) Notice: Subject to any disclaimer, the term of this patent is extended or adjusted under 35 U.S.C. 154(b) by 118 days.

(21) Appl. No.: 15/245,425

(22) Filed: Aug. 24, 2016

(65) Prior Publication Data

US 2017/0060132 A1     Mar. 2, 2017

(30) Foreign Application Priority Data

Aug. 31, 2015  (KR) .................. 10-2015-0122424

(51) Int. Cl.
G05D 1/02  (2006.01)

(52) U.S. Cl.
CPC .............. *G05D 1/024* (2013.01); *Y10S 901/01* (2013.01)

(58) Field of Classification Search
CPC .............................. G05D 1/024; Y10S 901/01
See application file for complete search history.

(56) References Cited

U.S. PATENT DOCUMENTS

2010/0066587 A1* 3/2010 Yamauchi ............ G05D 1/0044
                                                        342/70
2014/0126822 A1* 5/2014 Underwood ........... G01C 21/20
                                                        382/174

FOREIGN PATENT DOCUMENTS

JP      2013-534639 A    9/2013
KR   10-2014-0019501 A   2/2014
KR   10-2015-0062437 A   6/2015

OTHER PUBLICATIONS

Tavakkoli; "Efficient background modeling through incremental support vector data description"; ICPR 2008, Dec. 2008 (Year: 2008).*

H. P. Moravec, et al., "High Resolution Maps from Wide Angle Sonar," *Proceedings from the IEEE International Conference on Robotics and Automation*, March 25-28, 1985, pp. 116-121 (6 pages, in English).

(Continued)

Primary Examiner — Stephen Holwerda
(74) Attorney, Agent, or Firm — NSIP Law (57) ABSTRACT

A method detecting a floor obstacle using a laser range finder according to the present invention includes the following steps: (a) generating normal floor characteristic data with regard to a flat normal driving surface having no floor obstacle; (b) registering the normal floor characteristic data on a pre-registered one-class classification method; (c) obtaining sensing value of the laser range finder according to the driving of a mobile robot; (d) generating sensing value-floor characteristic data with respect to the sensing value; and (e) determining whether the sensing value indicates a normal driving surface or a floor obstacle by applying the sensing value-floor characteristic data to the one-class classification method. Therefore, an obstacle including a relatively small floor obstacle existing on the driving path of a mobile robot can be detected more effectively using a laser range finder, thereby providing more stably an area where the mobile robot can travel.

6 Claims, 6 Drawing Sheets

(56) References Cited

OTHER PUBLICATIONS

J. C. Andersen, et al., "Traversable terrain classification for outdoor autonomous robots using single 2D laser scans," *Integrated Computer-Aided Engineering*, vol. 13, No. 3, 2006, pp. 223-232 (10 pages, in English).

P. Pfaff, et al., "An Efficient Extension to Elevation Maps for Outdoor Terrain Mapping and Loop Closing," *The International Journal of Robotics Research*, vol. 26, No. 2, Feb. 2007, pp. 217-230 (14 pages, in English).

K. M. Wurm, et al., "Improving Robot Navigation in Structured Outdoor Environments by Identifying Vegetation from Laser Data," *Proceeding from the 2009 IEEE/RSJ International Conference on Intelligent Robots and Systems*, Oct. 11-15, 2009, St. Louis, Missouri, USA, pp. 1217-1222 (6 pages, in English).

M. W. McDaniel, et al., "Terrain Classification and Identification of Tree Stems Using Ground-based LiDAR," *Journal of Field Robotics*, vol. 29, No. 6, 2012, pp. 891-910 (20 pages, in English).

K. M. Wurm, et al., "Identifying vegetation from laser data in structured outdoor environments," *Robotics and Autonomous Systems*, vol. 62, 2014, pp. 675-684 (10 pages, in English).

\* cited by examiner

METHOD FOR DETECTING FLOOR OBSTACLE USING LASER RANGE FINDER

CROSS-REFERENCE TO RELATED APPLICATIONS

This application claims the benefit under 35 USC § 119(a) of Korean Patent Application No. 10-2015-0122424 filed on Aug. 31, 2015 in the Korean Intellectual Property Office, the entire disclosure of which is incorporated herein by reference for all purposes.

BACKGROUND

1. Field

The invention relates to a method of detecting a floor obstacle using a laser range finder and in particular, to a method of detecting a relatively small floor obstacle existing on the driving path of a mobile robot using a laser range finder.

2. Description of Related Art

The combination of autonomous driving of a mobile robot to service filed is being studied. Under the environments, the classification of an area where the mobile robot from given environments can drive must be carried out preferentially for the safe driving of the mobile robot. An ability to detect the drivable area influences the safety of the robot as well as the driving performance, and prevents a driving-failure situation which makes the robot platform overturned.

A research about analysis on the driving-possibility of a mobile robot under given environment is being carried out. General method to analyze the driving-possibility is a terrain detection method based on occupancy grid map which is disclosed in a paper titled "High resolution maps from wide angle sonar (IEEE International Conference on Robotics and Automation, pp. 116-121, 1985)" by H. P. Moravec and A. Elfes. This is a method of analyzing a terrain using features of terrain data recorded in a grid cell of a 2D grid map.

In a paper titled "An efficient extension to elevation maps for outdoor terrain mapping and loop closing (The International Journal of Robotics Research, vol. 26, no. 2, pp. 217-230, 2007.)" by Patrick Pfaff, et al., an analysis of the driving-possibility and a terrain mapping are carried out using a 2D elevation map.

The analysis of the driving-possibility based on the grid map as mentioned above makes it possible to easily analyze lots of data when a concentrated 3D point cloud is formed. However, in case of using a 2D laser range finder, each grid cell has few distance information and thus, it is difficult to analyze data. Also, the size of the obstacle which can be detectable is limited due to the gird resolution.

Meanwhile, the detection range is limited in the indoor environment. Since the speed of the robot platform is limited, it is important to precisely detect the terrain near the mobile robot, rather than to detect a wide range of terrain. In case of a 3D laser range finder having wide detection range, it is difficult to detect a terrain near the mobile robot. It is also difficult to add an addition 3D range finder for observing only the terrain near the mobile robot due to a high price.

To solve this problem, it is useful to incline a 2D laser range finder towards the floor. The use of a 2D laser range finder makes it possible to precisely detect a terrain near the mobile robot and to concentrate the detection of the floor thereby data processing can be easily done.

In a paper titled "Traversable terrain classification for outdoor autonomous robots using single 2D laser scans (Integrated Computer-aided engineering, vol. 13, no. 3, pp. 223-232, 2006.)" by J. C. Andersen, et al., a method of detecting the drivable area using a inclined 2D laser range finder is suggested.

In a paper by J. C. Andersen, et al., features such as height, distribution, inclination, etc. of the measured data are extracted and then the drivable area is defined.

However, it is disadvantageous that the classification of the driving surface from the plurality of features depends on Heuristic threshold and thus, problematically, Heuristic constant must be redefined with respect to a certain environment or platform.

Meanwhile, a research about a method of classifying driving surface based on a learning method is being studied. In one example, Support Vector Machine (SVM) disclosed in a paper titled "Terrain classification and identification of tree stems using ground based LiDAR (Journal of Field Robotics, vol. 29, no. 6, pp. 891-910, 2012.)" by M. W. McDaniel, et al., is a most widely-being-used method for classifying data of surrounding environments.

Besides, a paper titled "Improving robot navigation in structured outdoor environments by identifying vegetation from laser data (IEEE/RSJ International Conference on Intelligent Robots and Systems (IROS), pp. 1217-1222, 2009.) by Kai M. Wurm and a paper titled "Identifying vegetation from laser data in structured outdoor environments (Robotics and Autonomous Systems, vol. 62, no. 5, pp. 675-684, 2014.)" suggest a method of classifying terrain to identify area of trees and plants using the laser range finder.

Since the above mentioned method composes training data by using data of drivable area of the mobile robot as well as obstacle data, it has difficulty in collecting a number of data for obstacles of various types and sizes.

Also, relatively small obstacles located on the floor of the driving path cannot be easily detected by using the above mentioned method while relatively big obstacles such as people, desk, etc., on the driving path can be easily detected.

For example, garbage like a box paper which hinders the movement of the mobile robot or a tile protruded from the floor can be an obstacle which prevents the driving of the mobile robot.

As such, the situation can occur that an extremely small obstacle on the driving path prevents the robot platform from driving. However, the above mentioned methods cannot deal with the above situation.

SUMMARY

The invention is intended to solve the above problems and provides a method of detecting a floor obstacle using a laser range finder such that a relatively small floor obstacle existing on the driving path of a mobile robot can be effectively detected using a laser range finder, thereby more stably acquiring an drivable area of the mobile robot where the mobile robot can drive.

The object of the invention may be accomplished by a method of detecting a floor obstacle using a laser range finder comprising the following steps: (a) generating normal floor characteristic data with regard to a flat normal driving surface having no floor obstacle; (b) registering the normal floor characteristic data on a pre-registered one-class classification method; (c) obtaining sensing value of the laser range finder according to the driving of a mobile robot; (d) generating sensing value-floor characteristic data with regard to the sensing value; and (e) determining whether the sensing value indicates a normal driving surface or a floor obstacle by applying the sensing value-floor characteristic data to the one-class classification method.

Here, the step (a) comprises the following steps: (a1) making the mobile robot drive on the normal driving surface; (a2) collecting normal driving surface data from the sensing value of the laser range finder based on the driving on the normal driving surface during the step (a1); and (a3) generating the normal floor characteristic data based on the normal driving surface data.

Further, the normal driving surface comprises: a local coordinate value in a local coordinate system of the mobile robot at each measurement point of the laser range finder; and a vertical distance between a line segment of a real driving surface at each measurement point and the local coordinate value.

Also, the normal floor characteristic data comprises: Mahalanobis distance between a present local coordinate value and a previous local coordinate at each measurement point; and Mahalanobis distance between a present straight line distance and a previous straight line distance at each measurement point.

Further, the one-class classification method may comprise any one of Chi-square test and SVDD.

Also, the method may further comprise the following step: (f) calculating bias error at each measurement point of the laser range finder, wherein during the step (a2) and the step (a), the sensing value of the laser range finder at each measurement point is corrected by the bias error.

Further, the step (f) may comprise the following steps: (f1) obtaining sensing value by scanning the normal driving surface repeatedly by means of the laser range finder in a static condition of the mobile robot; (f2) estimating height of the floor at each measurement point by applying the sensing value obtained from the step (f1) to one-dimensional Kalman filter; and (f3) calculating a distance error between each measurement point and the laser range finder by the bias error with respect to each measurement point, based on the estimated height.

According to the above features of the present invention, an obstacle including a relatively small floor obstacle existing on the driving path of a mobile robot can be detected more effectively using a laser range finder, thereby more stably acquiring an drivable area of the mobile robot where the mobile robot can drive.

Further, small floor obstacle can be detected more precisely by applying bias error caused by a laser range finder itself to real sensing value and correcting the error.

DETAILED DESCRIPTION

Hereinafter, embodiments according to the invention will be explained in detail referring to the attached drawings.

Figure 1:
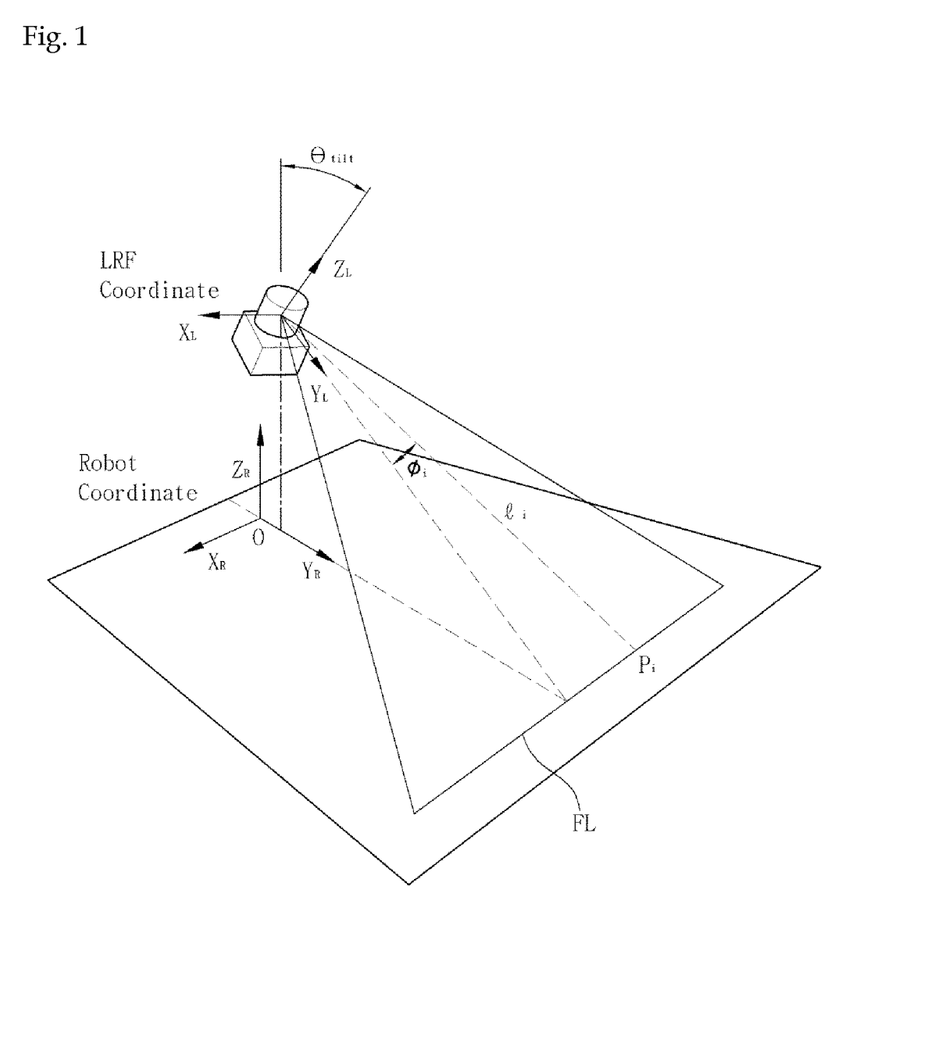
FIG. 1 shows a coordinate frame structure of a mobile robot and a laser range finder according to the present invention.

FIG. 1 shows a coordinate frame structure of a mobile robot and a laser range finder according to the present invention. In an example of the present invention, 2D laser range finder is used as the laser range finder and the distance is determined by detecting a laser which is incident forwardly at a predetermined angle and then is reflected back.

Referring to FIG. 1, the laser range finder is installed on the mobile robot at an inclination angle $\theta_{tilt}$ to a floor. An ith measurement point pi of the laser range finder has sensing values of a distance $l_i$ from the laser range finder and an angle $\varphi_i$.

Figure 2:
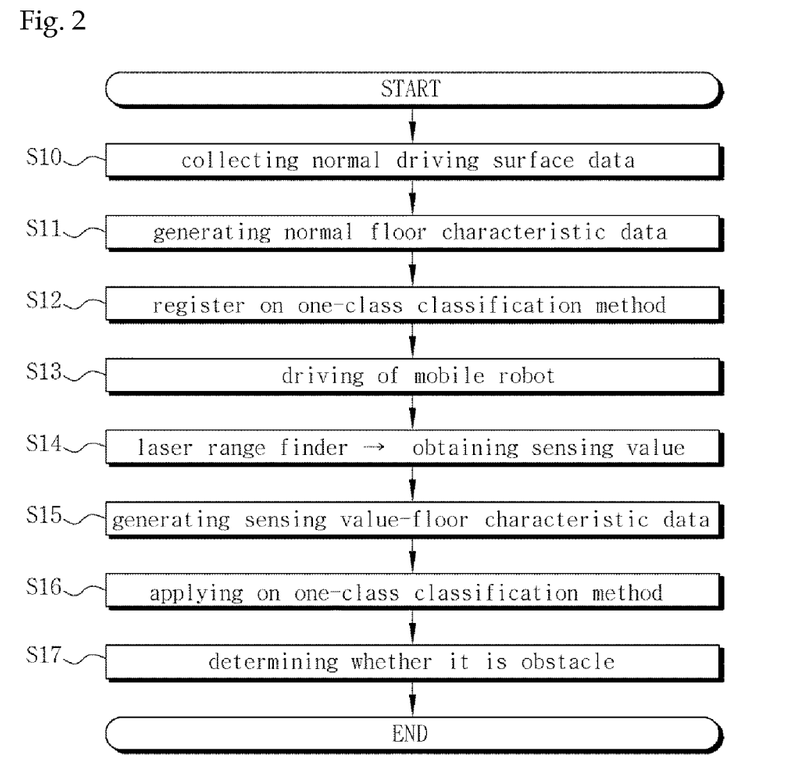
FIG. 2 shows a method of detecting a floor obstacle using a laser range finder according to the present invention.

FIG. 2 shows a method of detecting a floor obstacle using a laser range finder according to the present invention.

First, normal floor characteristics data with regard to a flat normal driving surface having no floor obstacles is generated (S11). In an example of the invention, a mobile robot drives on the flat normal driving surface having no floor obstacles to generate the normal floor characteristics data.

Particularly, in real driving environments of the mobile robot, a user manually drives the mobile robot on the flat normal surface having no floor obstacles.

Then, normal driving surface data is collected from sensing values of the laser range finder during the driving of the mobile robot (S10). Herein, in an example, the normal driving surface data measured by the driving of the mobile robot for a predetermined time is accumulated on a Rolling window having a window size n.

Figure 3A:
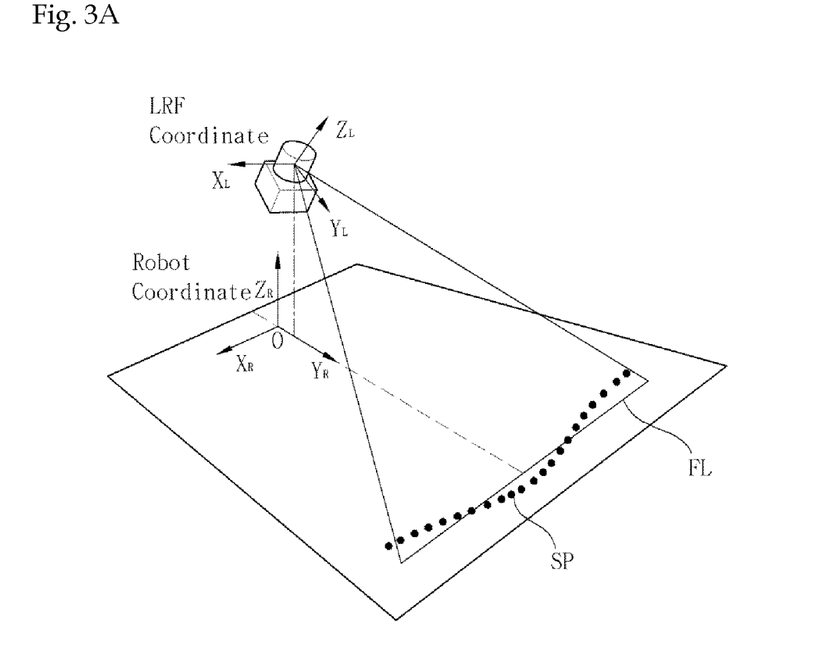
FIGS. 3A and 3B show data of a normal traveling surface in the method of detecting a floor obstacle using a laser range finder according to the present invention.
Figure 3B:
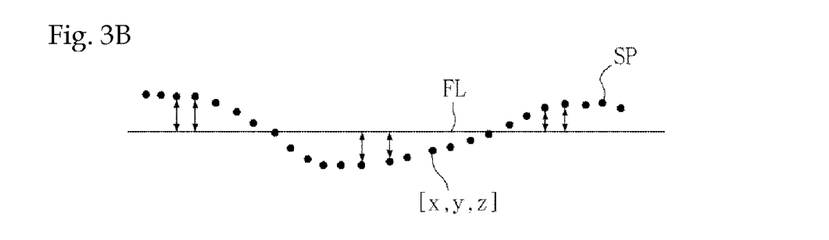

In an example of the present invention, as shown in FIGS. 3A and 3B, the normal driving surface data comprises a local coordinate value in a local coordinate system of the mobile robot based on the sensing value at each measurement point (SP) of the laser range finder and a vertical distance between a real driving surface line segment (FL) and the local coordinate system at each measurement point (SP).

Here, the driving surface line segment (FL) is a line segment which is scanned in front of the mobile robot when the laser range finder scans the driving surface ideally, i.e., when the driving surface is ideally flat and has no obstacles. In an example of the present invention, the driving surface line segment (FL) is obtained by a least square method.

As mentioned above, when the normal driving surface data is obtained with regard to each time unit and each measurement point (SP), the normal floor characteristics data is generated using the normal driving surface data (S11).

In an example of the present invention, the normal floor characteristics data is generated with regard to each of the two normal driving surface data. That is, Mahalanobis distance at each measurement point (SP) between the present local coordinate value and the previous local coordinate value is generated as one normal floor characteristics data and Mahalanobis distance at each measurement point (SP) between the present straight-line distance and the previous straight-line distance is generated as the other normal floor characteristics data. Herein, Mahalanobis distance represents the degree to which newly measured value is away from the previously measured value.

Mahalanobis distance for the local coordinate value and Mahalanobis distance for the vertical distance are calculated by the following formula 1 and formula 2, respectively.

$$d_i = (z_i - \mu_i)^T \left( \sum_i \right)^{-1} (z_i - \mu_i)$$ [Formula 1]

$$r_i = \frac{(e_i - m_i)^2}{s_i^2}$$ [Formula 2]

Here, $d_i$ is Mahalanobis distance for the local coordinate value at the ith measurement point, $z_i$ is the local coordinate value at the ith measurement point, $\mu_i$ is an average of the accumulated ith measurement values, and the accumulated ith $\Sigma_i$ is a covariance of the measurement pointes. Also, $r_i$ is Mahalanobis distance for the vertical distance at the ith measurement point, $e_i$ is a vertical distance at the ith measurement point, $m_i$ is an average of vertical distance of the accumulated ith measurement values, and $s_i$ is a standard deviation of vertical distance of the accumulated ith measurement values.

When the normal floor characteristic data is generated by the above mentioned method, the generated normal floor characteristic data is registered on a pre-registered one-class classification method (S12). In one example, Chi-square test or SVDD (Support Vector Data Description) is applied as the one-class classification method and this will be explained in detail hereinafter.

In state that the normal floor characteristic data and one-class classification method is registered on the mobile robot by the above mentioned process, the mobile robot drives autonomously on the real driving environment (S13), and then the sensing values are obtained by the laser range finder installed on the mobile robot (S14).

When sensing values are obtained by the laser range finder, a sensing value-floor characteristic data is generated from the sensing values (S15). Herein, the sensing value-floor characteristic data is generated by the same method as the normal floor characteristic data.

More specifically, based on sensing values of each measurement point, the local coordinate value of the mobile robot at each measurement point in the local coordinate system is calculated, and the vertical distance between the real driving surface line segment (FL) and the local coordinate system at each measurement point is calculated.

And then, Mahalanobis distance at each measurement point between the local coordinate value of the present sensing value and the previous local coordinate value and Mahalanobis distance at each measurement point between the straight distance of the present sensing value and the previous straight distance are generated as the sensing value-floor characteristic data.

As above, when the sensing value-floor characteristic data at each measurement point is generated based on the present sensing values, the sensing value-floor characteristic data is applied to one-class classification method (S16) and then, it is determined whether the sensing value, i.e., the corresponding measurement point is the normal driving surface or the floor obstacle (S17).

First, an example of the application of Chi-square test will be explained as one-class classification method according to the present invention.

Assuming the coordinate value z among a global coordinate for driving surface and the vertical distance e follow Gaussian distribution, Formula 1 and Formula 2 will follow Chi-square distribution. Confidence interval of 99.9% for the variables d and r which follow the Chi-square distribution is determined by Formula 3.

$$Pr\{d \leq \chi_{0.999}^2\} = Pr\{(z-\mu)^T(\Sigma)^{-1}(z-\mu) \leq \chi_{0.999}^2\} = 0.999$$

$$Pr\{r \leq \chi_{0.999}^2\} = Pr\{(e-m)^2/s^2 \leq \chi_{0.999}^2\} = 0.999$$ [Formula 3]

Here, z is a 3 dimensional Gaussian random vector and a degree of freedom is 3. Therefore, a critical value $\chi_{0.999}^2$ which determines the confidence interval 99.9% for z having the degree of freedom of 3 is found at the Chi-square distribution and is substituted.

Also, e is a Gaussian random vector and a degree of freedom of e is 1. Therefore, the critical value which determines the confidence interval 99.9% for e having the degree of freedom of 1 is selected by the same method of z.

By above method, if the sensing value-floor characteristic data calculated by the sensing value at ith measurement point satisfies Formula 4, the data will be determined as the normal driving surface. If not satisfied, the data will be determined as the floor obstacle.

$$(z_i - \mu_i)^T (\Sigma_i)^{-1} (z_i - \mu_i) \leq \chi_{0.999(DOF=3)}^2$$

$$(e_i - m_i)^2 / s_i^2 \leq \chi_{0.999(DOF=1)}^2$$ [Formula 4]

Meanwhile, an example of the application of SSVD method will be explained as one-class classification method according to the present invention.

SVDD method is a Kernel-based learning method for handling one-class classification method. The purpose of SVDD is to determine decision boundary having ball shape which comprises positive labeled data in the feature space. Therefore, even when no negative labeled data or few negative labeled data exist, decision boundary can be determined so that normal data can be expected.

In the embodiment of the present invention, when the normal floor characteristic data is registered on one-class classification method at the step S12 as shown in FIG. 2, the data is registered as training data of SVDD method. Also, optimal boundary based on the training data is determined by Formula 5.

$$\min_{R^2, a, \xi} F(R, a) = R^2 + C \sum_i^n \xi_k$$ [Formula 5]

$$\text{s.t. } \|x_k - a\|^2 \leq R^2 + \xi_k, \quad \xi \geq 0, \quad \forall k$$

Here, n is the number of the training data x. As described above, the training data is Mahalanobis distance calculated by Formula 1 and Formula 2 by the normal floor characteristic data and it will be $x_i = [d_i \ r_i]$.

Decision boundary comprising n positive labeled data in the feature space is expressed such that the center is a, and the diameter of the sphere is R. $\xi_k$ is a penalty of the negative labeled data which strays the decision boundary, and is defined as slack variable. C is a constant to adjust the balance between the size of the area of decision boundary and the penalty.

Figure 4:
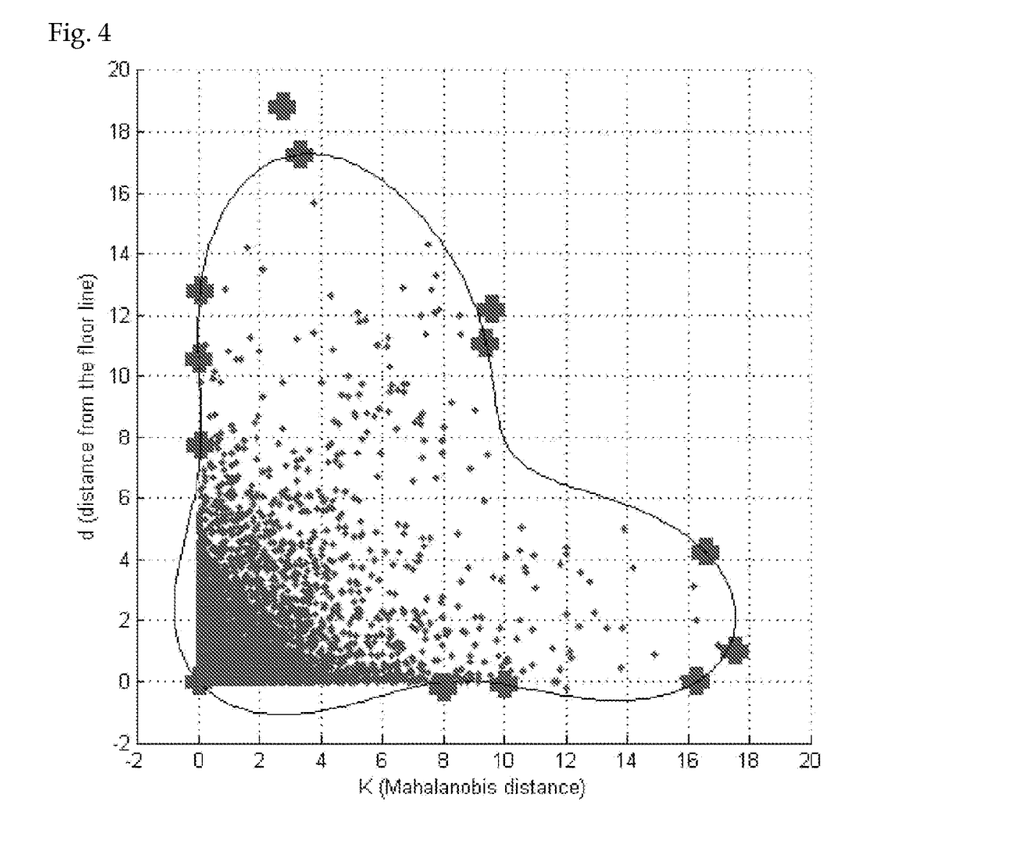
FIG. 4 shows an example of decision boundary obtained using training data by SVDD (support vector data description) according to the present invention.

When the normal floor characteristic data is registered as the training data through the above SVDD method, the decision boundary is determined at each measurement point. FIG. 4 shows an example of decision boundary obtained using the training data by SVDD according to the present invention. In FIG. 4, black-colored points represent the training data according to the present invention in the characteristic space.

Gaussian kernel function is used to obtain an optimal decision boundary comprising the normal floor characteristic data in the characteristic space. In FIG. 4, black-colored solid line represents the decision boundary obtained by SVDD with respect to the normal floor characteristic data.

Herein, the constant C is experimentally adjusted such that the ratio of support vector represented by a thick cross point and the size of the boundary can be determined. In an example, by setting C=10, the decision boundary comprising 98.6% of the positive level data, i.e., the normal floor is obtained.

In case that the decision boundary is obtained by the above method, if the sensing value-floor characteristic data of each measurement point with respect to the present sensing value is out of the decision boundary or on the decision boundary, the data indicates the floor obstacle.

Meanwhile, the method of detecting a floor obstacle using the laser range finder according to the present invention calculates a bias error generated by the laser range finder and applies the bias error to the sensing of the laser range finder.

As explained above, by the method of detecting the floor obstacle according to the present invention, the relatively small floor obstacle which can exist on the floor can be detected. If there is the bias error of the laser range finder, i.e., the error caused by the laser range finder itself, it can be difficult to detect the floor obstacle due to the error.

In an example, the bias error of the laser range finder is calculated at each measurement point and the bias error is applied to the sensing value of the laser range finder at each measurement point, thereby the error is compensated. That is, both the sensing value of the laser range finder during the generation of the normal floor characteristic data and the sensing value of the laser range finder during the free driving of the mobile robot are compensated using the bias error.

Hereinafter, the process of calculating bias error in the method of detecting floor obstacle according to the invention will be described.

Figure 5A:
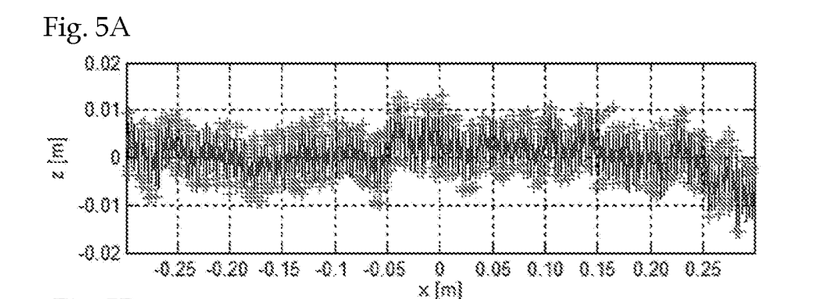
FIGS. 5A and 5B show graphs representing experiment results from the measurement of a flat floor using a laser range finder.
Figure 5B:
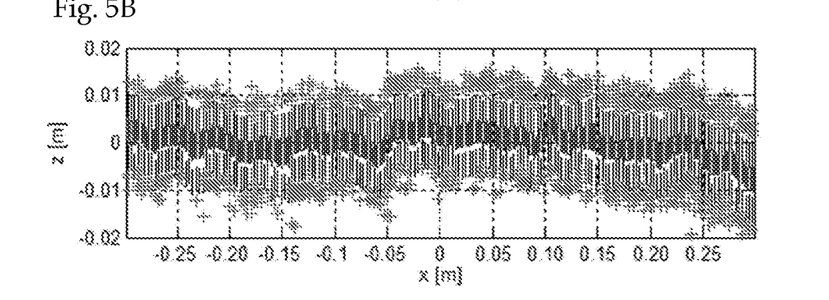
Figure 6:
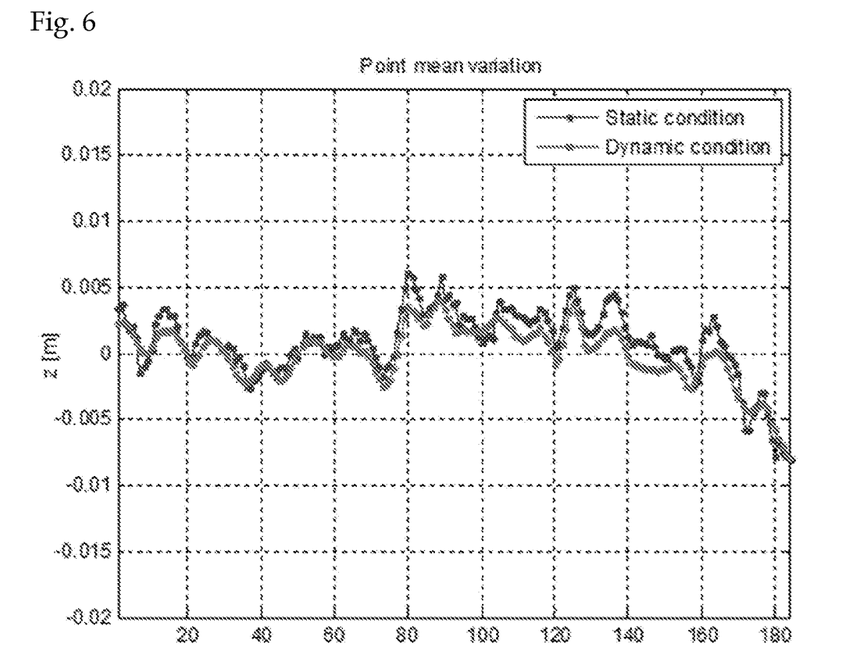
FIG. 6 shows mean values of height at each measurement point based on the experiment results of FIG. 5.

FIGS. 5A and 5B show graphs representing experiment results from the measurement of a flat floor using a laser range finder. FIG. 5A represents the distribution of height of a sensing value when the mobile robot is in a static condition and FIG. 5B represents the distribution of height of a sensing value obtained when the mobile robot is in a dynamic condition. FIG. 6 shows mean values of height at each measurement point. Even if the measurement was carried out on the flat floor, the mean value of height at each measurement point does not indicate a zero value due to the bias error.

As explained above, the bias error is a structured error caused by the laser range finder itself. Therefore, as shown in FIG. 6, at each measurement point, the degree of bias error of the mobile robot in a static condition is substantially the same as the degree of bias error of the mobile robot in a dynamic condition. That is, it is possible to obtain the bias error of the laser range finder in a static condition of the mobile robot at each measurement point and then to apply the error to the real driving condition.

Therefore, in a device of detecting a floor obstacle using the laser range finder according to the invention, sensing values are obtained by scanning the normal driving surface repeatedly by means of the laser range finder when the mobile robot is stopped and the sensing values are applied to an one-dimensional Kalman filter to estimate height of the floor at each measurement point. Then, based on the estimated height, distance error between each measurement point and the laser range finder is calculated by the bias error with respect to each measurement point.

In particular, Formula 6 and formula 7 are applied to the sensing value $z_i$ at the time of t and the sensed noise $\sigma_i$.

$$h_i^t = \frac{(\sigma_i^t)^2 h_i^{t-1} + v_{t-1}^i z_i^t}{v_i^{t-1} + (\sigma_i^t)^2} \quad \text{[Formula 6]}$$

$$v_i^t = \frac{v_i^{t-1}(\sigma_i^t)^2}{v_i^{t-1} + (\sigma_i^t)^2} \quad \text{[Formula 7]}$$

Here, $h_i$ and $v_i$ represent the height and the variance, respectively, which are estimated by one-dimensional Kalman filter with respect to each measurement point at the time of t. The measurement noise $\sigma$ is based on values which are set according to the specifications of the laser range finder. Height is estimated at each measurement point in a static state by the measurement of the normal driving surface during the time of 0 to t. Here, assuming the height of the flat floor is zero, the estimated height $h_i$ is an error of height measurement at the ith measurement point.

Figure 7:
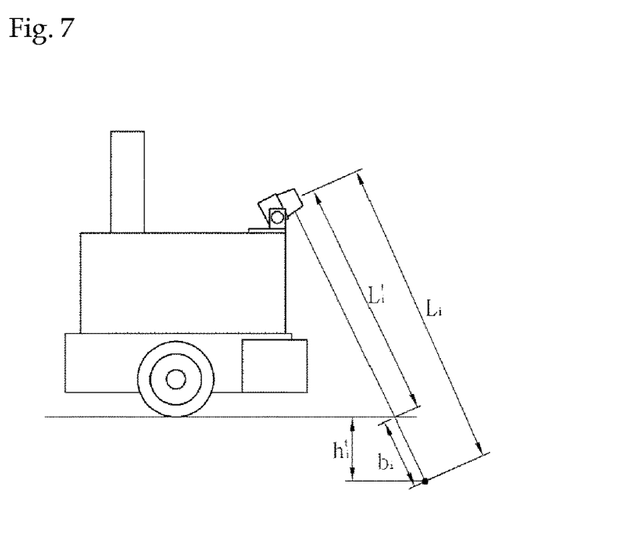
FIG. 7 explains a correction theory by a bias error in the method of detecting a floor obstacle using a laser range finder according to the present invention.

As shown in FIG. 7, using the height measurement error, the bias error $b_i$ at the ith measurement point and the corrected distance $L_i$ are obtained by formula 8 and formula 9.

$$b_i = \frac{h_i}{\sin(\theta_{tilt}) \cdot \cos(\phi_i)} \quad \text{[Formula 8]}$$

$$L_i' = L_i + b_i \quad \text{[Formula 9]}$$

That is, using the bias error $b_i$ at the ith measurement point, it is possible to correct the distance $L_i$ of the sensing value which is measured by the laser range finder.

Figure 8A:
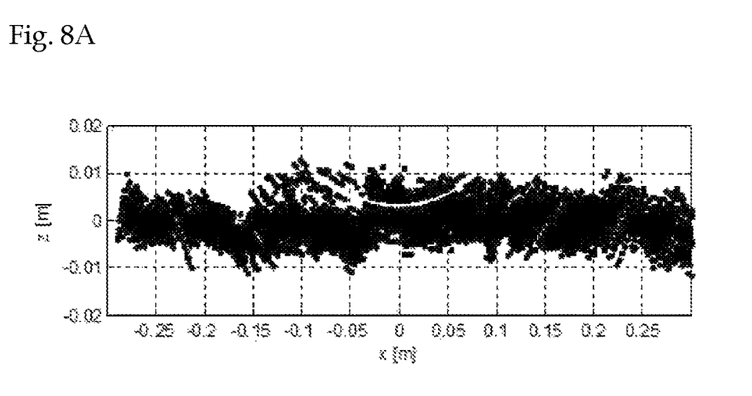
FIGS. 8A and 8B show measurement heights before and after the application of a bias error in the method of detecting a floor obstacle using a laser range finder according to the present invention.
Figure 8B:
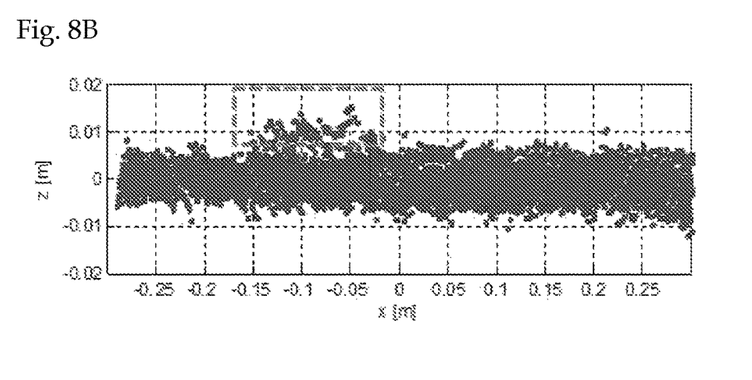

FIG. 8A represents a height measured without considering bias error in the method of detecting a floor obstacle using the laser range finder according to the present invention and FIG. 8B represents a height measured with the application of bias error. The graphs in FIGS. 8A and 8B are measured when a box paper is laid onto the normal floor. The box paper is not detected before the correction as shown in FIG. 8A and the box paper is detected after the correction by the bias error as shown in FIG. 8B.

Therefore, the floor obstacle having relatively low height can be detected accurately by the correction of the sensing value with the bias error.

It is intended that the foregoing descriptions have described only a few of the many possible implementations of the present invention and that variations or specific embodiments apparent to those skilled in the art within the scope and spirit of the invention are embraced within the scope and spirit of the invention.

The invention claimed is:

1. A method of detecting a floor obstacle using a laser range finder, performed by a mobile robot, the method comprising:
    driving the mobile robot on a flat normal driving surface having no floor obstacle;
    collecting normal driving surface data from a sensing value of the laser range finder based on the driving of the mobile robot on the flat normal driving surface;
    calculating bias error for each measurement point of the laser range finder;

generating normal floor characteristic data based on the normal driving surface data;

registering the normal floor characteristic data on a pre-registered one-class classification method;

generating sensing value-floor characteristic data in relation to the sensing value;

applying the sensing value-floor characteristic data to the one-class classification method;

applying the bias error to the sensing value at each of the measurement points; and determining whether the sensing value, which corresponds to the sensing value-floor characteristic data, indicates a floor obstacle, based on the normal floor characteristic data.

2. The method according to claim 1, wherein the normal driving surface data comprises a local coordinate value in a local coordinate system of the mobile robot at each measurement point of the laser range finder, and a vertical distance between a line segment of a real driving surface at each measurement point and the local coordinate value.

3. The method according to claim 2, wherein the normal floor characteristic data comprises a Mahalanobis distance between a present local coordinate value and a prior local coordinate value at each measurement point, and a Mahalanobis distance between a present straight line distance and a prior straight line distance at each measurement point.

4. The method according to claim 3, wherein the one-class classification method comprises either one of a Chi-square test and Support Vector Data Description (SVDD).

5. The method according to claim 1, wherein during the collecting of the normal driving surface data, the sensing value at each measurement point is corrected by the bias error.

6. The method according to claim 5, wherein the calculating of the bias error comprises obtaining the sensing value by scanning the normal driving surface repeatedly with the laser range finder in a static condition of the mobile robot, estimating height of the floor at each measurement point by applying the obtained sensing value to a one-dimensional Kalman filter, and calculating a distance error between each measurement point and the laser range finder by the bias error with respect to each measurement point, based on the estimated height of the floor.

* * * * *